United States Patent
Yu

(10) Patent No.: US 7,882,805 B2
(45) Date of Patent: Feb. 8, 2011

(54) APPARATUS FOR TOILET TRAINING A PET AND METHOD FOR TOILET TRAINING A CAT

(76) Inventor: Niki Yu, No. 103-1, Jhongsing St. Jhonghe City, Taipei County (TW) 23560

( * ) Notice: Subject to any disclaimer, the term of this patent is extended or adjusted under 35 U.S.C. 154(b) by 414 days.

(21) Appl. No.: 12/034,710

(22) Filed: Feb. 21, 2008

(65) Prior Publication Data

US 2009/0211530 A1   Aug. 27, 2009

(51) Int. Cl.
*A01K 29/00* (2006.01)
*A01K 1/01* (2006.01)

(52) U.S. Cl. ...................... 119/162; 119/165
(58) Field of Classification Search ........... 119/162, 119/163, 165, 166; 4/300.3, 445, 420.3
See application file for complete search history.

(56) References Cited

U.S. PATENT DOCUMENTS

| | | | | |
|---|---|---|---|---|
| 2,053,594 A * | 9/1936 | Albert | ......... | 119/162 |
| 2,251,039 A * | 7/1941 | Da Silva | ......... | 4/445 |
| 2,584,656 A * | 2/1952 | Anderson | ......... | 119/162 |
| 3,688,742 A * | 9/1972 | McGee | ......... | 119/162 |
| 3,729,748 A * | 5/1973 | Perlman | ......... | 4/445 |
| 3,949,429 A * | 4/1976 | Hall | ......... | 4/420 |
| 4,152,788 A * | 5/1979 | Gomes | ......... | 4/445 |
| 4,181,096 A * | 1/1980 | Grubman | ......... | 119/162 |
| D256,735 S * | 9/1980 | Denk | ......... | D30/161 |
| 4,437,430 A * | 3/1984 | DeBardeleben | ......... | 119/162 |
| 5,103,772 A * | 4/1992 | Schmid | ......... | 119/162 |
| 5,216,979 A * | 6/1993 | Sallee et al. | ......... | 119/162 |
| 6,014,946 A * | 1/2000 | Rymer | ......... | 119/162 |
| 6,119,629 A * | 9/2000 | Sicchio | ......... | 119/162 |
| 6,145,475 A * | 11/2000 | Jackson | ......... | 119/162 |
| 6,341,578 B1 * | 1/2002 | Berube | ......... | 119/162 |
| 6,418,880 B1 * | 7/2002 | Chiu | ......... | 119/162 |
| 6,701,539 B1 * | 3/2004 | Hogan | ......... | 4/235 |
| 6,860,231 B1 * | 3/2005 | Rus | ......... | 119/162 |
| 7,225,481 B2 * | 6/2007 | Culmer | ......... | 4/661 |
| 7,395,784 B2 * | 7/2008 | Hirokawa et al. | ......... | 119/165 |
| 2007/0017023 A1 * | 1/2007 | Berube et al. | ......... | 4/661 |

* cited by examiner

*Primary Examiner*—Yvonne R. Abbott
(74) *Attorney, Agent, or Firm*—Ladas & Parry LLP

(57) ABSTRACT

An apparatus for toilet training a pet includes a toilet seat adapted to be connected to a toilet bowl and formed with a first opening. A toilet seat cover is connected liftably to the toilet seat, and has a top cover surface, a bottom cover surface, and a second opening formed through the top and bottom cover surfaces, where the second opening is smaller than the first opening and has a size sufficient to permit the pet to squat on the top cover surface. A receptacle is disposed removably on the toilet seat cover and extends through the second opening in the toilet seat cover and the first opening in the toilet seat.

13 Claims, 6 Drawing Sheets

APPARATUS FOR TOILET TRAINING A PET AND METHOD FOR TOILET TRAINING A CAT

BACKGROUND OF THE INVENTION

1. Field of the Invention

This invention relates to an apparatus for toilet training a pet and a method for toilet training a cat using the toilet training apparatus.

2. Description of the Related Art

Treatment of pet excrement is a major problem for a pet owner. For example, cat litter has to be prepared to allow the cat to relieve itself thereon. The cat litter has to be cleaned and replaced periodically so that the owner has to afford the big expense on the cat litter. In addition, because of habitual behavior of the cat, the cat litter is usually poked and falls outside a litter container, thereby aggravating the cleaning problem.

Therefore, there is a need in the art to provide an apparatus and a method for toilet training a pet to use a toilet bowl so as to eliminate the expense for cat litter and so as to solve the problem of cleaning cat litter.

SUMMARY OF THE INVENTION

Therefore, the object of the present invention is to provide an apparatus and a method for toilet training a pet that can overcome the aforesaid drawbacks of the prior art.

According to one aspect of this invention, an apparatus for toilet training a pet comprises: a toilet seat cover adapted to be connected to a toilet bowl, and having a top cover surface, a bottom cover surface, and an opening formed through the top and bottom cover surfaces, the top cover surface permitting the pet to squat thereon; and a receptacle removably disposed in the opening of the toilet seat cover.

According to another aspect of this invention, a method for toilet training a cat comprises:

(a) providing a toilet training apparatus which includes:
a toilet seat adapted to be connected to a toilet bowl and formed with a first opening,
a toilet seat cover connected liftably to the toilet seat, and having a top cover surface, a bottom cover surface, and a second opening formed through the top and bottom surfaces, the second opening being smaller than the first opening and having a size sufficient to permit the cat to squat on the top cover surface, and
a receptacle disposed removably on the toilet seat cover and extending through the second opening in the toilet seat cover and the first opening in the toilet seat;

(b) positioning the toilet seat and the toilet seat cover of the toilet training apparatus on a litter container containing cat litter, and lowering the toilet seat cover on the toilet seat to allow the cat to squat on the top cover surface and to relieve itself on the cat litter in the litter container through the second and first openings;

(c) after the cat gets used to the idea of relieving itself by squatting on the top cover surface of the toilet seat cover, removing the toilet seat and the toilet seat cover of the toilet training apparatus from the litter container, connecting the toilet seat to the toilet bowl, filling an amount of cat litter in the receptacle, and disposing the receptacle on the toilet seat cover so that cat excrement can fall into the receptacle through the second and first openings when the cat squats on the top cover surface to relieve itself on the cat litter in the receptacle; and (d) after the cat gets used to the idea of relieving itself by squatting on the top cover surface of the toilet seat cover with the toilet seat connected to the toilet bowl, removing the receptacle from the toilet seat cover so that cat excrement can fall into the toilet bowl through the second and first openings when the cat squats on the top cover surface to relieve itself.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
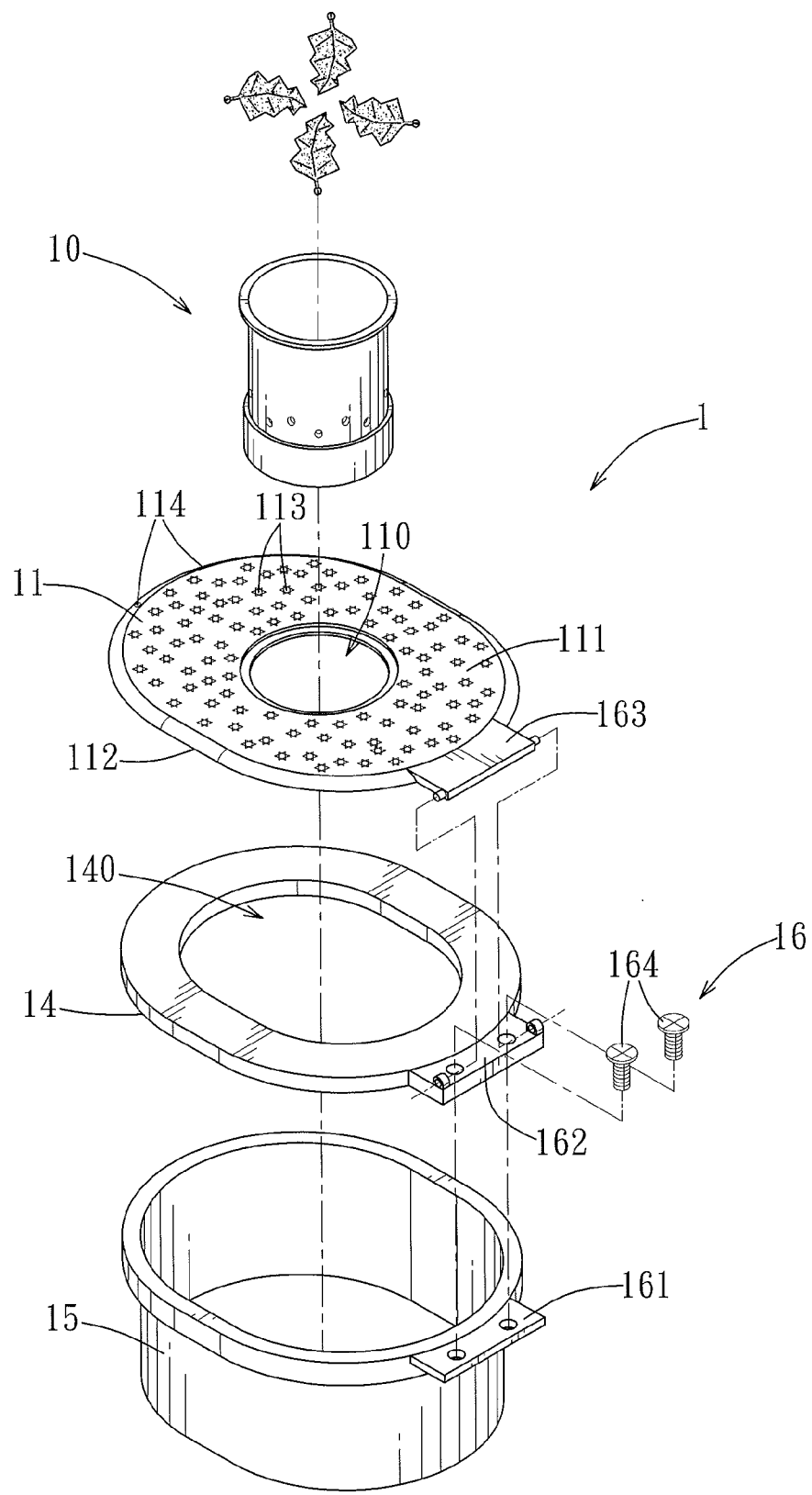
FIG. 1 is an exploded perspective view of the preferred embodiment of an apparatus for toilet training a pet according to this invention, which is connected to a litter container.
Figure 2:
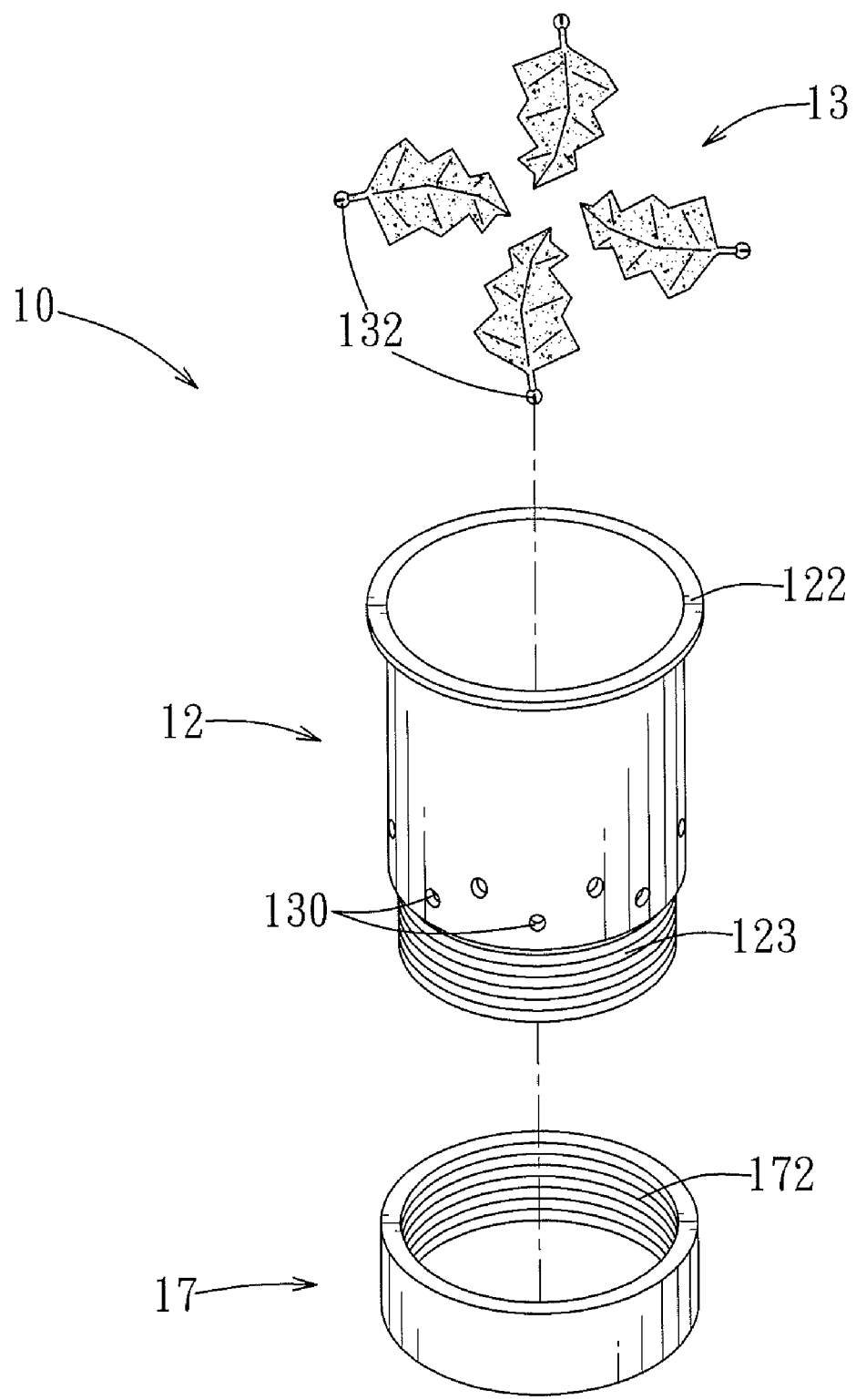
FIG. 2 is an exploded perspective view of a receptacle and litter simulating elements included in the apparatus shown in FIG. 1.

Referring to FIGS. 1 and 2, the preferred embodiment of an apparatus 1 for toilet training a pet according to the present invention is shown to include: a toilet seat cover 11 having a top cover surface 111, a bottom cover surface 112, and a second opening 110 formed through the top and bottom cover surfaces, 111, 112, the top cover surface 111 permitting the pet to squat thereon; and a receptacle 10 removably disposed in the second opening 110 of the toilet seat cover 11.

Preferably, the apparatus 1 further includes a toilet seat 14 formed with a first opening 140. The toilet seat cover 11 is connected liftably to the toilet seat 14, and the second opening 110 in the toilet seat cover 11 is smaller than the first opening 140 and has a size sufficient to permit the pet to squat on the top cover surface 111. The toilet seat 14 is adapted to be connected to a litter container 15 or a toilet bowl 2 through a connecting unit 16 (see FIGS. 1 and 7). As shown in FIG. 1, the connecting unit 16 includes a first connecting part 162 connected to the toilet seat 14, a second connecting part 163 connected to the toilet seat cover 11, and two screws 164 for fastening the first connecting part 162 of the toilet seat 14 and a connecting member 161 of the litter container 15 or of the toilet bowl 2 together. In addition, the second connecting part 163 is designed to pivot about the first connecting part 162 such that the toilet seat cover 11 can be lifted from the toilet seat 14. It should be noted that the connecting unit 16 is not limited to the aforesaid structure and can be any other connecting member suitable for the above purpose.

Figure 3:
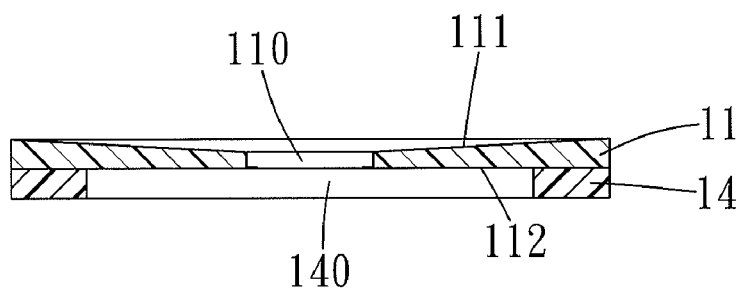
FIG. 3 is a cross-sectional view of the toilet seat and the toilet seat cover included in the apparatus shown in FIG. 1.

Preferably, the top cover surface 111 of the toilet seat cover 11 is a roughened surface to permit the pet to firmly stand or squat thereon. In addition, when the apparatus 1 is used to train a cat, the roughened surface can be designed to have a litter simulating pattern 113 for assisting the cat in easily getting used to the top cover surface 111. As shown in FIG. 3, preferably, the top cover surface 111 of the toilet seat cover 11]

inclines from an outer periphery thereof to the second opening 110 so as to guide the excrement that falls on the top cover surface 111 to fall into the toilet bowl 2 through the second opening 110.

As shown in FIG. 2, the receptacle 10 includes a tubular part 12 and a cap part 17. The tubular part 12 has an upper end 122 that engages removably a periphery of the second opening 110 of the toilet seat cover 11, and a lower end 123 opposite to the upper end 122 and formed with a screw thread on an outer surface thereof. The cap part 17 is formed with a screw thread on an inner surface 172 thereof so as to be secured removably to the tubular part 12 by engagement between the screw threads. The cap part 17 is adapted to receive litter material and pet excrement falling into the receptacle 10 via the second opening 110 of the toilet seat cover 11 and the upper end 122 of the tubular part 12.

Figure 4:
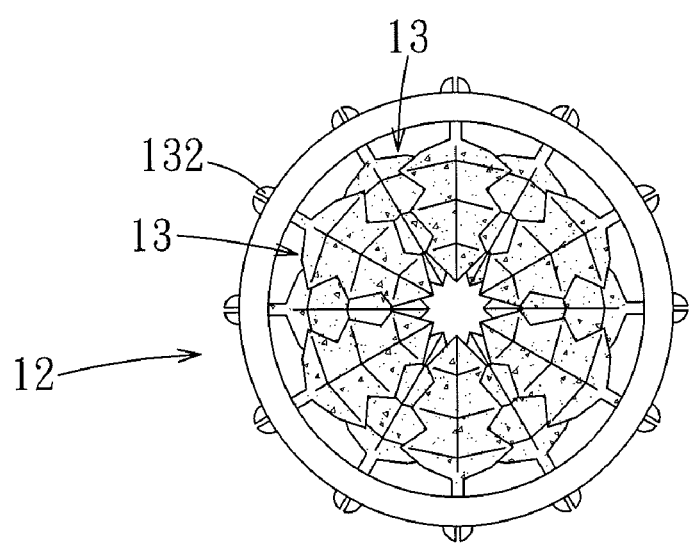
FIG. 4 is a top view of the receptacle and litter the simulating elements shown in FIG. 2.

As shown in FIG. 2, preferably, the apparatus 1 further includes litter simulating elements 13 disposed removably in the receptacle 10. Specifically, the receptacle 10 is formed with a plurality of radial insert holes 130. Each of the litter simulating elements 13 is in a form of an artificial leaf with an enlarged anchor end 132 secured removably to a respective one of the radial insert holes 130 (see FIG. 4). Since the litter simulating elements 13 are used to replace the cat litter and to mislead the cat, they can be designed to have a pattern and/or scent like litter material.

Figure 7:
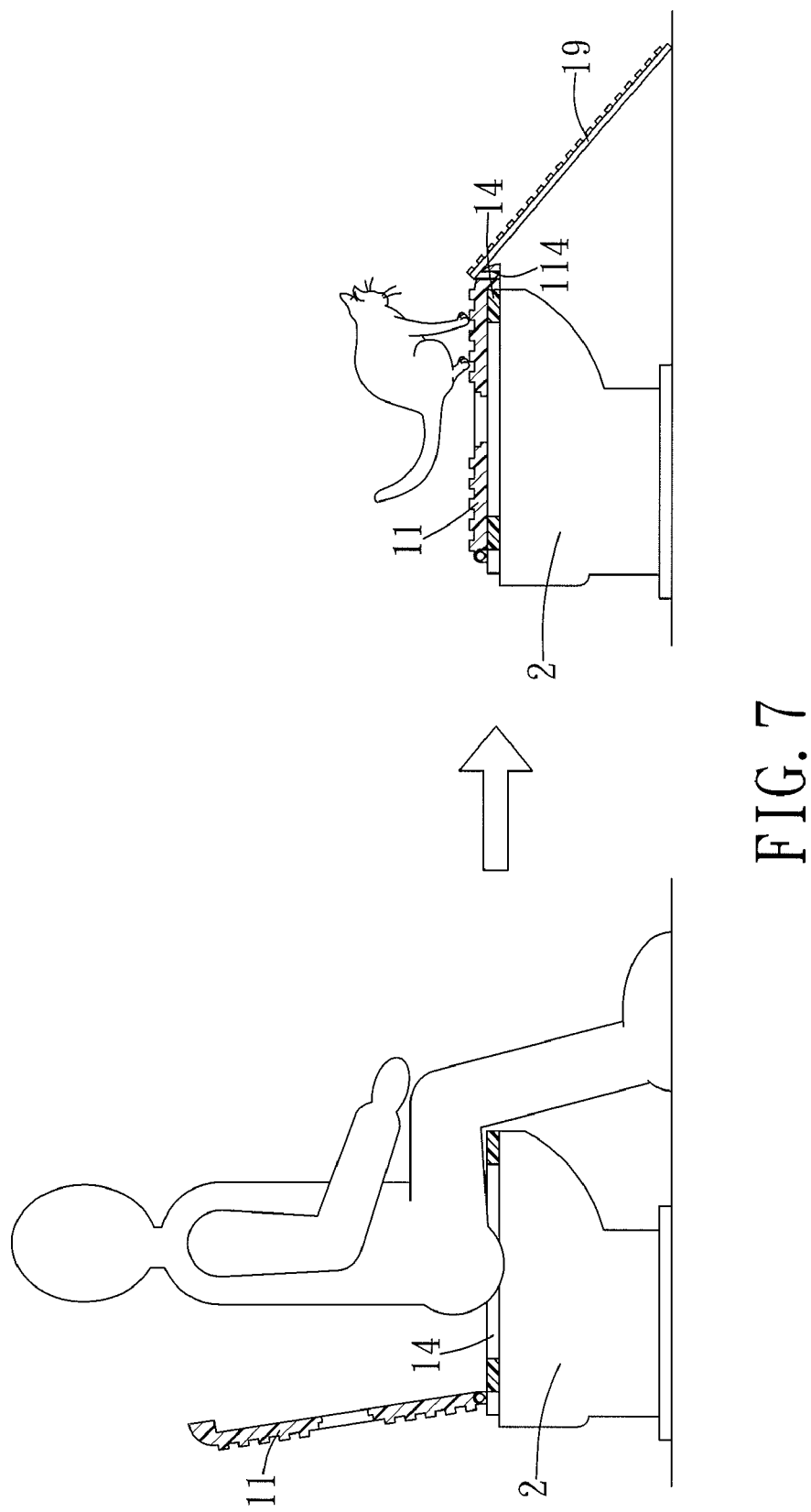
FIG. 7 is a schematic diagram illustrating the situations where the apparatus shown in FIG. 1 is connected to a toilet bowl and is used by a person and a cat.

Preferably, the apparatus 1 further includes a ramp 19 for assisting the pet in climbing on top of the toilet seat cover 11 when the toilet seat cover 11 covers the toilet seat 14 that is connected to the toilet bowl 2 (see FIG. 7). The toilet seat cover 11 is formed with holes 114 for connecting the ramp 19 thereto (see FIGS. 1 and 7).

Figure 5:
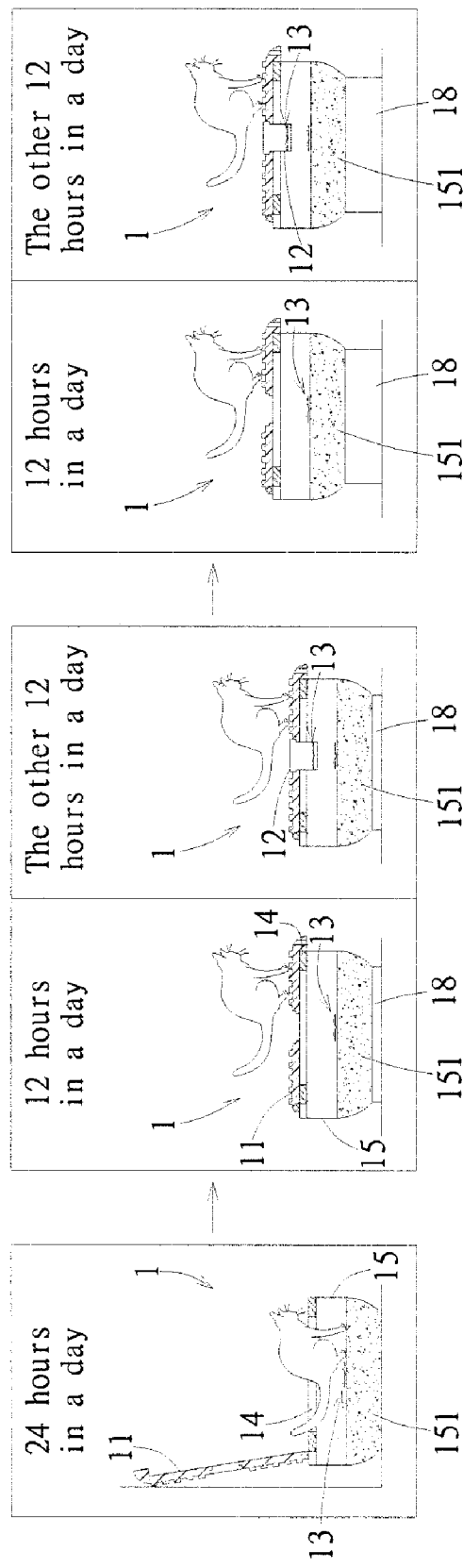
FIGS. 5 and 6 are flow diagrams illustrating consecutive steps of the preferred embodiment of a method for toilet training a cat according to this invention.
Figure 6:
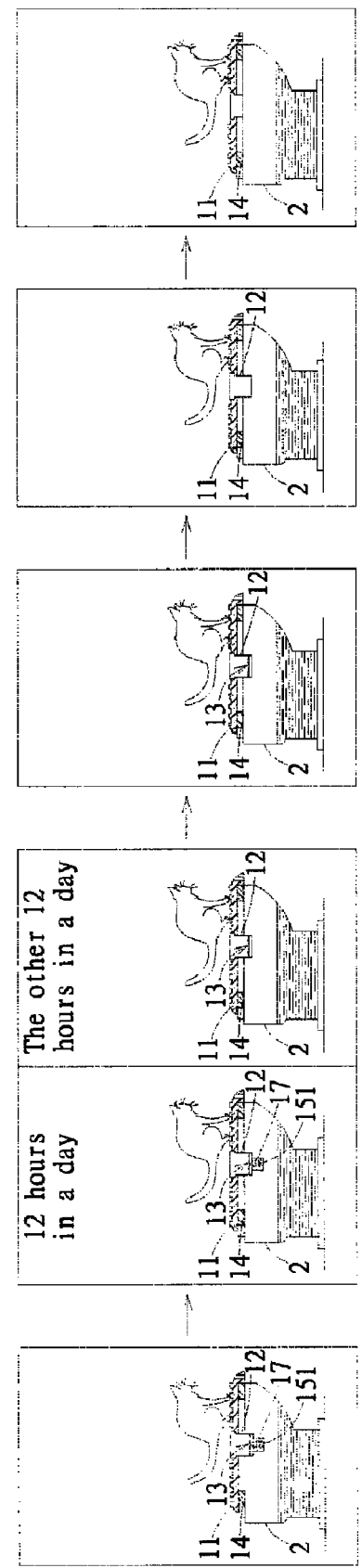

FIGS. 5 and 6 illustrate a method for toilet training a pet using the apparatus 1 shown in FIG. 1. A cat is used as an example in this invention. The method for toilet training a cat includes following steps:

(a) providing the aforesaid toilet training apparatus 1;

(b) positioning the toilet seat 14 and the toilet seat cover 11 of the toilet training apparatus 1 on a litter container 15 containing cat litter 151, placing the litter simulating elements 13 on the cat litter 151, and lifting the toilet seat cover 11 to allow the cat to squat and to relieve itself on the cat litter 151 in the litter container 15;

(c) lowering the toilet seat cover 11 on the toilet seat 14 to allow the cat to squat on the top cover surface 111 when relieving itself, and alternately placing and removing the tubular part 12 of the receptacle 10, which has the litter simulating elements 13 disposed therein, on and from the toilet seat cover 11 so that cat excrement falls on the cat litter 151 in the litter container 15 through the tubular part 12 when the tubular part 12 is placed on the toilet seat cover 11, and through the second and first openings 110, 140 when the tubular part 12 is removed from the toilet seat cover 11;

(d) after the cat gets used to the idea of relieving itself by squatting on the top cover surface 111 of the toilet seat cover 11, removing the toilet seat 14 and the toilet seat cover 11 of the toilet training apparatus 1 from the litter container 15, connecting the toilet seat 14 to the toilet bowl 2, disposing the tubular part 12 with the litter simulating elements 13 disposed therein on the toilet seat cover 11, filling an amount of cat litter 151 in the cap part 17 of the receptacle 12, and alternately connecting and disconnecting the cap part 17 to and from the tubular part 12 so that cat excrement can fall into the cap part 17 when the cap part 17 is connected to the tubular part 12 and can fall into the toilet bowl 2 when the cap part 17 is disconnected from the tubular part 12;

(e) after the cat gets used to the idea of relieving itself without requiring the cat litter 151, disconnecting the cap part 17 from the tubular part 12, and gradually reducing the number of the litter simulating elements 13 in the tubular part 12; and (f) permanently removing the tubular part 12 of the receptacle 10 from the toilet seat cover 11.

For allowing the cat to adapt itself to the environment where it will relieve itself, the litter container 15 in step (b) is positioned near the toilet bowl 2. Step (b) is conducted for 1 to 3 days to allow the cat to get used to the environment and the litter simulating elements 13.

Preferably, in step (c), an assembly of the litter container 15 and the toilet training apparatus 1 is gradually raised using an elevating member 18 until a height thereof reaches that of the toilet bowl 2 such that the cat can adapt itself to the height of the toilet bowl 2. The amount of the litter simulating elements 13 is gradually increased in this step such that the cat can get used to the litter simulating elements 13 and equate the litter simulating elements 13 to the cat litter. Step (c) is conducted for several days, and the tubular part 12 of the receptacle 10 is placed on the toilet seat cover 11 for 12 hours in a day, and is removed from the toilet seat cover 11 for the other 12 hours in a day (see FIG. 5).

Preferably, in step (d), the entire toilet training apparatus 1 is disposed on the toilet bowl 2 for 2 to 3 days to allow the cat to get used to the idea of relieving itself on the toilet bowl 2. In addition, periods for connecting and disconnecting the cap part 17 to and from the tubular part 12 are about 12 hours in a day, respectively, and continue for about 3 days.

Preferably, step (e) is conducted for about 3 days.

It should be noted that, because of different learning abilities among cats, each of the steps can be repeated and the time for each of the steps can be shortened or lengthened. In addition, if the cat can be trained merely using the toilet seat cover 11, the litter simulating elements 13 can be dispensed with, and the steps relevant to the litter simulating elements 13 can be omitted. Without the litter simulating elements 13, the tubular part 12 and the cap part 17 of the receptacle 10 can be integrally made, and the stage of placing and removing the tubular part 12 of the receptacle 10 on and from the toilet seat cover 11 in step (c) and the stage of disconnecting the cap part 17 from the tubular part 12 can be omitted.

FIG. 7 shows the situations where the toilet training apparatus 1 of this invention is disposed on the toilet bowl 2 and where the pet owner and the pet use the toilet training apparatus 1. After using the toilet, the pet owner lowers the toilet seat cover 11 on the toilet seat 14 to permit the cat to squat on the toilet seat cover 11 to relieve itself into the toilet bowl 2.

According to this invention, with the toilet training apparatus 1 and the toilet training method, the pet can relieve itself into the toilet bowl 2 without using the cat litter 151 so that the expense for the cat litter can be eliminated and the problem of cleaning cat litter can be solved.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. An apparatus for toilet training a pet, comprising:
    a toilet seat cover adapted to be connected to a toilet bowl, and having a top cover surface, a bottom cover surface, and an opening formed through said top and bottom cover surfaces, said top cover surface permitting the pet to squat thereon; and a receptacle removably disposed in said opening of said toilet seat cover, wherein said top cover surface of said toilet seat cover is a roughened surface.

2. An apparatus for toilet training a pet, comprising:
a toilet seat cover adapted to be connected to a toilet bowl, and having a top cover surface, a bottom cover surface, and an opening formed through said top and bottom cover surfaces, said top cover surface permitting the pet to squat thereon;
a receptacle removably disposed in said opening of said toilet seat cover,
wherein said receptacle includes:
a tubular part having an upper end that engages removably a periphery of said opening of said toilet seat cover, and a lower end opposite to said upper end; and a cap part removably secured to said lower end of said tubular part and adapted to receive litter material and pet excrement falling into said receptacle via said opening of said toilet seat cover and said upper end of said tubular part.

3. An apparatus for toilet training a pet, comprising:
a toilet seat cover adapted to be connected to a toilet bowl, and having a top cover surface, a bottom cover surface, and an opening formed through said top and bottom cover surfaces, said top cover surface permitting the pet to squat thereon;
a receptacle removably disposed in said opening of said toilet seat cover; and
litter simulating elements disposed removably in said receptacle.

4. The apparatus of claim 3, wherein said receptacle is formed with a plurality of radial insert holes, and each of said litter simulating elements is in a form of an artificial leaf with an enlarged anchor end secured removably to a respective one of said radial insert holes.

5. An apparatus for toilet training a pet, comprising:
a toilet seat adapted to be connected to a toilet bowl and formed with a first opening;
a toilet seat cover connected liftably to said toilet seat, and having a top cover surface, a bottom cover surface, and a second opening formed through said top and bottom cover surfaces, said second opening being smaller than said first opening and having a size sufficient to permit the pet to squat on said top cover surface; and
a receptacle disposed removably on said toilet seat cover and extending through said second opening in said toilet seat cover and said first opening in said toilet seat,
wherein said top cover surface of said toilet seat cover is a roughened surface.

6. An apparatus for toilet training a pet, comprising:
a toilet seat adapted to be connected to a toilet bowl and formed with a first opening;
a toilet seat cover connected liftable to said toilet seat, and having a top cover surface, a bottom cover surface, and a second opening formed through said top and bottom cover surfaces, said second opening being smaller than said first opening and having a size sufficient to permit the pet to squat on said top cover surface; and
a receptacle disposed removably on said toilet seat cover and extending through said second opening in said toilet seat cover and said first opening in said toilet seat,
wherein said receptacle includes:
a tubular part having an upper end that engages removably a periphery of said second opening of said toilet seat cover, and a lower end opposite to said upper end; and
a cap part removably secured to said lower end of said tubular part and adapted to receive litter material and pet excrement falling into said receptacle via said second opening of said toilet seat cover and said upper end of said tubular part.

7. An apparatus for toilet training a pet, comprising:
a toilet seat adapted to be connected to a toilet bowl and formed with a first opening;
a toilet seat cover connected liftably to said toilet seat, and having a top cover surface, a bottom cover surface, and a second opening formed through said top and bottom cover surfaces, said second opening being smaller than said first opening and having a size sufficient to permit the pet to squat on said top cover surface;
a receptacle disposed removably on said toilet seat cover and extending through said second opening in said toilet seat cover and said first opening in said toilet seat; and
litter simulating elements disposed removably in said receptacle.

8. The apparatus of claim 7, wherein said receptacle is formed with a plurality of radial insert holes, and each of said litter simulating elements is in a form of an artificial leaf with an enlarged anchor end secured removably to a respective one of said radial insert holes.

9. A method for toilet training a cat, comprising:
(a) providing a toilet training apparatus which includes:
a toilet seat adapted to be connected to a toilet bowl and formed with a first opening,
a toilet seat cover connected liftably to the toilet seat, and having a top cover surface, a bottom cover surface, and a second opening formed through the top and bottom surfaces, the second opening being smaller than the first opening and having a size sufficient to permit the cat to squat on the top cover surface, and
a receptacle disposed removably on the toilet seat cover and extending through the second opening in the toilet seat cover and the first opening in the toilet seat;
(b) positioning the toilet seat and the toilet seat cover of the toilet training apparatus on a litter container containing cat litter, and lowering the toilet seat cover on the toilet seat to allow the cat to squat on the top cover surface and to relieve itself on the cat litter in the litter container through the second and first openings;
(c) after the cat gets used to the idea of relieving itself by squatting on the top cover surface of the toilet seat cover, removing the toilet seat and the toilet seat cover of the toilet training apparatus from the litter container, connecting the toilet seat to the toilet bowl, filling an amount of cat litter in the receptacle, and disposing the receptacle on the toilet seat cover so that cat excrement can fall into the receptacle through the second and first openings when the cat squats on the top cover surface to relieve itself on the cat litter in the receptacle; and
(d) after the cat gets used to the idea of relieving itself by squatting on the top cover surface of the toilet seat cover with the toilet seat connected to the toilet bowl, removing the receptacle from the toilet seat cover so that cat excrement can fall into the toilet bowl through the second and first openings when the cat squats on the top cover surface to relieve itself.

10. The method of claim 9, wherein, in step (b), an assembly of the litter container and the toilet training apparatus is gradually raised until a height thereof reaches that of the toilet bowl.

11. A method for toilet training a cat, comprising:
(a) providing a toilet training apparatus which includes:

a toilet seat adapted to be connected to a toilet bowl and formed with a first opening, a toilet seat cover connected liftably to the toilet seat, and having a top cover surface, a bottom cover surface, and a second opening formed through the top and bottom surfaces, the second opening being smaller than the first opening and having a size sufficient to permit the cat to squat on the top cover surface, a receptacle disposed removably on the toilet seat cover and extending through the second opening in the toilet seat cover and the first opening in the toilet seat, the receptacle including a tubular part having an upper end that engages removably a periphery of the second opening of the toilet seat cover, and a lower end opposite to the upper end, and a cap part removably secured to the lower end of the tubular part, and litter simulating elements disposed removably in the receptacle;

(b) positioning the toilet seat and the toilet seat cover of the toilet training apparatus on a litter container containing cat litter, placing the litter simulating elements on the cat litter, lowering the toilet seat cover on the toilet seat to allow the cat to squat on the top cover surface when relieving itself, and alternately placing and removing the tubular part of the receptacle, which has the litter simulating elements disposed therein, on the toilet seat cover so that cat excrement falls on the cat litter in the litter container through the tubular part when the tubular part is placed on the toilet seat cover and through the second and first openings when the tubular part is removed from the toilet seat cover;

(c) after the cat gets used to the idea of relieving itself by squatting on the top cover surface of the toilet seat cover, removing the toilet seat and the toilet seat cover of the toilet training apparatus from the litter container, connecting the toilet seat to the toilet bowl, disposing the tubular part with the litter simulating elements disposed therein on the toilet seat cover, filling an amount of cat litter in the cap part of the receptacle, and alternately connecting and disconnecting the cap part to and from the tubular part so that cat excrement can fall into the cap part when the cap part is connected to the tubular part and can fall into the toilet bowl when the cap part is disconnected from the tubular part;

(d) after the cat gets used to the idea of relieving itself without requiring the cat litter, disconnecting the cap part from the tubular part, and gradually reducing the number of the litter simulating elements in the tubular part; and (e) permanently removing the tubular part of the receptacle from the toilet seat cover.

12. The method of claim 11, wherein, in step (b), an assembly of the litter container and the toilet training apparatus is gradually raised until a height thereof reaches that of the toilet bowl.

13. The method of claim 11, wherein each of the litter simulating elements is in a form of an artificial leaf.

* * * * *